(12) United States Patent
Hough et al.

(10) Patent No.: US 8,304,459 B2
(45) Date of Patent: *Nov. 6, 2012

(54) RUBBER DE-VULCANISATION USING RAPID DECOMPRESSION OF SUPERCRITICAL FLUID

(75) Inventors: Philip J. Hough, Herefordshire (GB); Anthony N. Hough, Taunton (GB)

(73) Assignee: Rubber-Regen LLP, Taunton (GB)

( * ) Notice: Subject to any disclaimer, the term of this patent is extended or adjusted under 35 U.S.C. 154(b) by 237 days.

This patent is subject to a terminal disclaimer.

(21) Appl. No.: 12/279,294

(22) PCT Filed: Feb. 13, 2007

(86) PCT No.: PCT/GB2007/000500
§ 371 (c)(1),
(2), (4) Date: Mar. 25, 2009

(87) PCT Pub. No.: WO2007/093782

PCT Pub. Date: Aug. 23, 2007

(65) Prior Publication Data
US 2009/0203807 A1    Aug. 13, 2009

(30) Foreign Application Priority Data

Feb. 14, 2006 (GB) .................................. 0602891.4
Jan. 9, 2007 (GB) .................................. 0700360.1

(51) Int. Cl.
*C08J 11/04* (2006.01)
(52) U.S. Cl. .............. 521/41; 521/40; 521/40.5; 521/43; 521/45.5; 528/480; 528/501; 528/502 R; 528/502 C

(58) Field of Classification Search .................... 521/40, 521/40.5, 41, 41.5, 42, 42.5, 43, 44, 44.5, 521/45.5; 528/480, 481, 483, 487, 490, 501, 528/502 R, 502 C, 502 E, 502 F, 503; 241/2, 241/5, 15

See application file for complete search history.

(56) References Cited

U.S. PATENT DOCUMENTS 6,548,560 B1 * 4/2003 Kovalak et al. ................. 521/41
(Continued)

FOREIGN PATENT DOCUMENTS
EP    1 186 625    3/2002
(Continued)

OTHER PUBLICATIONS

International Search Report for PCT/GB2007/000500, mailed Oct. 8, 2007.
(Continued)

*Primary Examiner* — Frances Tischler
(74) *Attorney, Agent, or Firm* — Nixon & Vanderhye P.C.

(57) ABSTRACT

The present invention relates to a method for preferentially breaking cross-links in a vulcanized rubber, thereby de-vulcanizing the rubber, by the use of a supercritical fluid, such as carbon dioxide. The supercritical fluid maintained at an appropriate solubility parameter, swells the vulcanized rubber to a state of equilibrium swell. The cross links become fully extended and under strain to hold the internal pressures caused by the solvent swelling affect of the supercritical gas. When equilibrium swell has been achieved, the pressure within the processing vessel is rapidly dropped to a predetermined level causing a degassing and expansion of the supercritical fluid that has been absorbed within the vulcanized rubber. The resulting three dimensional separation of the rubber molecules will put a further rapid strain on the cross links, causing them to break, thereby giving the affect of de-vulcanization.

4 Claims, 5 Drawing Sheets

U.S. PATENT DOCUMENTS 6,680,110 B1 * 1/2004 Deeb et al. .................... 428/327
2003/0026975 A1 2/2003 Rouse et al.

FOREIGN PATENT DOCUMENTS

| JP | 8-291228 | 11/1996 |
| JP | 2003-26854 | 1/2003 |
| WO | 03/029298 | 4/2003 |

OTHER PUBLICATIONS

Written Opinion of the International Search Authority, mailed Oct. 8, 2007.

International Preliminary Report on Patentability, dated Jun. 12, 2008.

* cited by examiner

RUBBER DE-VULCANISATION USING RAPID DECOMPRESSION OF SUPERCRITICAL FLUID

This application is the U.S. national phase of International Application No. PCT/GB2007/000500, filed 13 Feb. 2007, which designated the U.S. and claims priority to Great Britain Application No. 0602891.4, filed 14 Feb. 2006; and Great Britain Application No. 0700360.1, filed 9 Jan. 2007, the entire contents of each of which are hereby incorporated by reference.

BACKGROUND OF THE INVENTION

The present invention relates to the destruction of cross-links (de-vulcanisation) in cured rubber by the rapid and controlled decompression of supercritical fluid. More specifically, this invention relates to the swelling of vulcanised rubber in supercritical fluid to a point of equilibrium swell, followed by a rapid and controlled partial decompressing of the supercritical fluid to cause a rapid three dimensional expansion of the vulcanised rubber, thereby causing preferential breakage of cross-links.

Many millions of tonnes of vulcanised rubber waste are generated world wide each year from both end of life products such as tyres and from production line waste generated by rubber processors. For many years attempts have been made to find ways of recycling such waste into new rubber products for commercial, economic and legislative reasons, but although some methods show technical promise, none have been widely adopted by the rubber industry. The excellent physical and chemical properties of vulcanised rubbers that are exploited in a wide range of products make the recycling of these materials extremely difficult. Chemical cross-linking of adjacent rubber molecules results in thermoset properties and excellent thermal resistance. Vulcanised rubbers cannot therefore be melted and reformed as would be the case with thermoplastic polymers. In the same way, the stable three dimensional network of chemically cross-linked rubber molecules causes vulcanised rubbers to be insoluble in solvents, permitting only swelling to take place. A further characteristic of vulcanised rubber is that the vulcanisation process utilises the majority of chemically active sites along the rubber molecules, causing the surface of vulcanised rubber to have low surface energy leading to poor interfacial adhesion to a new rubber matrix.

Extensive research papers and patents describe a range of ways to overcome the inherent difficulties of recycling waste rubbers including methods for chemically increasing surface energy, and techniques for de-vulcanisation by chemical, biological or mechanical means, the use of heat or high frequency energy, or a combination of these methods. In many cases, the techniques described are slow. Alternatively they may employ toxic chemicals or use high levels of energy, and tend to be incapable of only cleaving cross-links without reducing the molecular weight of the rubber, resulting in a significant reduction of physical properties.

An object of this invention is to provide a method for de-vulcanising cured rubber by the use of supercritical fluid while largely preserving the molecular weight of the rubber and therefore its potential physical and chemical properties when re-vulcanised or blended into a new rubber matrix. Further objects of this invention are to provide a rapid method of de-vulcanising cured rubber by the use of supercritical fluid that is non hazardous to process operators or the environment and uses low levels of processing energy.

Accordingly, this invention provides a rapid non-hazardous process for destroying chemical cross-links in cured rubber while largely maintaining the molecular weight of the rubber molecules.

Preferably the vulcanised rubber is processed in a pressurised vessel containing carbon dioxide as a supercritical fluid at an appropriate temperature and pressure to achieve a solubility parameter suitable to swell the vulcanised rubber to an equilibrium state, as determined by the cross-link density and the distribution of cross-link types, i.e. cyclic sulphides, monosulphidic, disulphidic or polysulphidic, but may instead use other supercritical fluids such as nitrogen or a refrigerant. Once equilibrium swell conditions have been achieved, the supercritical fluid undergoes a rapid but controlled decompression, causing gassing of the supercritical fluid and expansion of the vulcanised rubber beyond the level of equilibrium swell determined by the constraining forces of the cross-links, thereby causing the cross-links to break. It is reported, (Tobolsky et al.)[1], that in cross-linked diene rubber systems, sulphur-sulphur bonds are the weakest chemical bonds. The carbon-carbon single bond energy in peroxide-cross-linked vulcanised rubber is 93 kcal/mol, the bond energy of a carbon-sulphur-carbon bond in monosulphide cross-linked rubber is 50-60 kcal/mol, whereas the bond energy of a carbon-sulphur-sulphur-carbon bond in disulphide cross-linked rubber is 35 kcal/mol and the bond energy of a carbon-(sulphur)n-carbon bond in polysulphide cross-linked rubber is 27 kcal/mol. The invention exploits the weaker carbon-sulphur and sulphur-sulphur bonds by applying a three dimensional strain that exceeds the breaking strain of the cross-links while not exceeding the breaking strain of the carbon-carbon bonds along the back bone of the rubber molecule. It is further recognised that rubber molecules are highly extendable; being of considerable length with molecular weights typically greater than 100,000. By comparison, sulphur cross-links are very short in length and have very little ability to extend under conditions of strain.

The selection of appropriate conditions of temperature and pressure of the supercritical fluid is generally made by matching the solubility parameter of the supercritical fluid to that of the vulcanised rubber.

The solubility parameter of a fluid is normally measured in terms of the Hildebrand solubility parameter, which is defined as follows:

$$\delta = [(\Delta H - RT)/V_m]^{1/2}$$

where $\delta$ is the Hildebrand solubility parameter $(MPa)^{1/2}$
$\Delta H$ is the heat of vaporisation $(KJ\ mol^{-1})$
R is the universal gas constant $(KJ\ mol^{-1}\ K^{-1})$
T is temperature (Kelvin)
$V_m$ is the molar volume $(dm^3\ mol^{-1})$.

In general, substances having a similar value of solubility parameter mix well. In the case of a fluid and a polymer having a similar solubility parameter, the polymer will generally dissolve well in the fluid. However, in the case of a fluid and a polymer where the polymer exhibits a substantial degree of cross-linking (such as vulcanised rubber), the polymer does lot dissolve in the fluid. Instead, the fluid permeates the polymer causing swelling.

Thus, in the case of a supercritical fluid (e.g. $CO_2$) diffusing into a vulcanised rubber, the selection of the process conditions controls the degree to which the supercritical fluid permeates the rubber. From the above equation, it can be seen that the solubility parameter of the supercritical $CO_2$ may be adjusted by modifying the pressure or the temperature of the fluid. Increasing the temperature will decrease the solubility parameter of the supercritical $CO_2$. By contrast, increasing the pressure will increase the solubility parameter. Therefore, by adjusting the temperature and pressure according to above equation, the solubility parameter of the supercritical fluid and that of the vulcanised rubber can be matched to maximise the swelling of the vulcanised rubber. It is desirable to maximise the swelling of the rubber because this means that the sulphur-containing cross links are extended before the external pressure is reduced, so that when this pressure drop takes place, the maximum internal pressure is applied to the sulphur containing cross links causing the cross links to exceed their point of maximum extension, resulting in their rupture.

Starting from conditions under which the supercritical fluid exhibits a lower solubility parameter than the vulcanised rubber, the level of equilibrium swelling of the rubber will increase as the solubility parameter of the supercritical fluid increases towards the solubility parameter value of the rubber material. As the solubility parameter of the supercritical fluid approaches that of the vulcanised rubber, the degree of swelling of the vulcanised rubber will level off before beginning to decrease as the solubility parameter of the supercritical fluid increases beyond that of the vulcanised rubber.

Typical solubility parameters of rubbers are in the range 14-22 $MPa^{1/2}$ with polar vulcanised rubbers tending to have a value of solubility parameter at the higher end of this scale. For supercritical $CO_2$ at a temperature of about 305K (just above the critical point) this corresponds to a pressure range between about 100 and 400 bar. However, in practice, the degree of swelling is observed to increase relatively rapidly with pressure up to about 100 bar and then more slowly up to the value at which maximum swell is achieved.

The application of high pressures does increase the cost of the process and so in some embodiments, it is preferred that the initial pressure be less than the pressure required to obtain the maximum level of equilibrium swell, for example the pressure level may be set at or slightly above the level at which the variation of swelling with increased pressure begins to level off. The initial pressure level selected will therefore depend on the vulcanised rubber but will usually be less than 400 bar, such as less than 300 bar, for example less than 200 bar or less than 150 bar e.g. less than 120 bar. The initial pressure level must be above the supercritical level of the fluid and so is preferably greater than 80 bar, for example greater than 90 bar, such as greater than 100 bar.

As well as the pressure, it is necessary to control the temperature of the supercritical fluid. Since the solubility parameter decreases with increasing temperature, it is generally preferred that the initial temperature be maintained at as low a level as will allow the fluid to remain supercritical, in order to reduce the pressure required to achieve a given solubility parameter. However, in some embodiments, particularly those in which it is desired that the fluid remain supercritical following the initial pressure reduction step, the initial temperature may be higher.

In the case of $CO_2$, the critical temperature is 31.1° C. and so, depending on the embodiment, the initial temperature of the $CO_2$ is maintained at a temperature greater than 32° C., for example greater than 40° C., such as greater than 50° C., or greater than 60° C. The initial temperature of the $CO_2$ will also usually be less than 140° C., for example less than 120° C., such as less than 100° C., or less than 80° C.

As mentioned above, at a given temperature, the degree of swelling of the vulcanised rubber increases relatively quickly with pressure up to a given pressure value and then more slowly as pressure increases beyond this value. This has the advantageous effect that at relatively high pressures, the degree of swell obtainable following an initial pressure drop is only slightly less than that obtainable at the initial pressure.

This enables the use of a multistage pressure reduction in which the pressure is reduced as previously specified and then the rubber allowed to reach equilibrium swell before the pressure is reduced again. The equilibration process following the initial pressure reduction takes place much more quickly where the fluid remains in a supercritical state than when the fluid becomes subcritical on the pressure reduction. This allows for an increased yield of de-vulcanised rubber in a shorter timescale than would be the case if the fluid needed to be repressurised in order to become supercritical and repermeate the rubber.

A preferred embodiment of the invention is now described with reference to the accompanying drawings in which.

Central to the invention is that supercritical fluids display unique physiochemical properties: they are of low viscosity, high diffusivity and have high thermal conductivity. Under the correct conditions of temperature and pressure the solubility parameter of supercritical fluids can be controlled to closely match the solubility parameter of vulcanised rubber, making the supercritical fluid an excellent solvent for vulcanised rubber, allowing easy impregnation into the rubbers three dimensional molecular network, causing it to swell. Among several supercritical fluids, $CO_2$ is the most advantageous for this invention, having an easily obtainable critical point and being chemically inactive, non-toxic, non-flammable and inexpensive.

Figure 1:
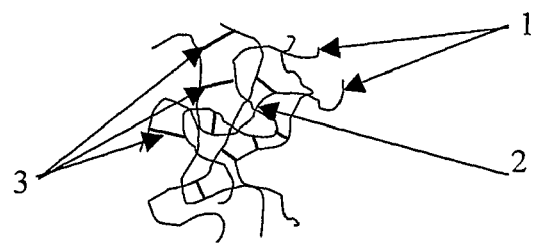
FIG. 1 Shows a representation of relaxed cross-linked rubber molecules in normal ambient conditions.

FIG. 1 shows a representation of vulcanised rubber in a relaxed state consisting of long chained molecules (1) held together by some chain entanglement (2), but predominantly by the presence of chemical cross-links (3) between adjacent molecules. It is the combination of highly extendable long chained molecules and chemical cross-links that gives rubber its unique elastic properties. Without the influence of chemical cross-links, rubbers would be predominantly plastic by nature and would be easily dissolved by suitable solvents to form free flowing solutions. Within the present invention, the rubber would preferably be sourced from vulcanised process waste generated from rubber processing industry or from end of life vulcanised rubber products such as car or truck tyres. Also within the present invention the vulcanised rubber would be as a formed solid, but would preferably undergo a process of grinding prior to the process described herein as the invention to form a particulate of the vulcanised rubber. The particulate size and shape is not critical to the outcome of the invention process, although its efficiency will be affected.

Smaller particles offer an improved surface area to volume ratio for the effectiveness and efficiency of the invention. Typically, the particle size of the vulcanised rubber particulate might be from 10 mm diameter reducing to 0.038 mm (ASTM mesh No. 400), but would preferably be within the range of 1.00 mm (18 mesh) to 0.15 mm (100 mesh), and more preferably be within the range of 0.425 mm (40 mesh) to 0.18 mm (80 mesh) which offers a balance of useful surface area to volume ration and reasonable grinding cost.

Figure 2:
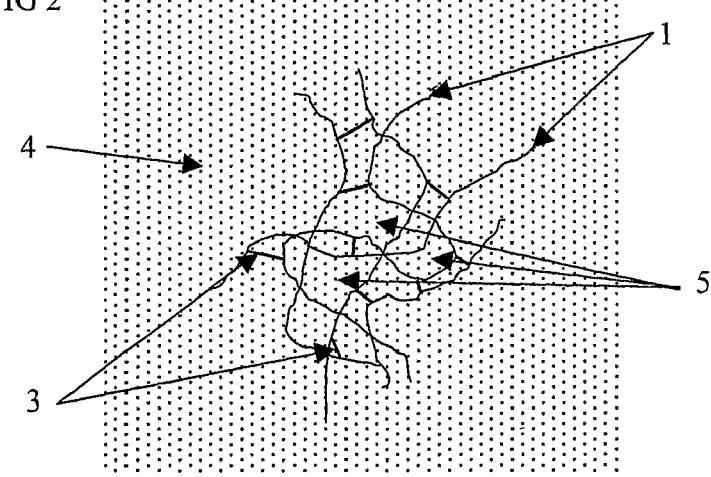
FIG. 2 Shows a representation of cross-linked rubber molecules in a swollen state in supercritical fluid at an appropriate temperature and pressure to maintain a supercritical state.

The vulcanised rubber, preferably in particulate form, as described, is placed into a temperature controllable pressure vessel such as an autoclave. Carbon dioxide in gas or liquid form, but preferably in liquid form is pumped into the pressure vessel at or above its critical pressure of 7.4 Mpa. The temperature of the interior of the pressure vessel is then increased to, or above the supercritical temperature of carbon dioxide, being equal to or greater than 31.1° C. so that the carbon dioxide becomes a supercritical fluid and fills the autoclave chamber. At supercritical conditions the density of carbon dioxide as a supercritical fluid is 0.469 g/cm$^3$. The density of the supercritical fluid, its diffusivity into polymeric materials and its solubility parameter is, however, highly dependent upon changes to both temperature and pressure above the critical points[2], allowing someone trained in the art to select an optimum set of conditions so as to match the solubility parameter of the vulcanised rubber to be processed, thereby enabling conditions for rapid advancement to equilibrium swell. FIG. 2 portrays the vulcanised rubber under conditions of equilibrium swell in a supercritical fluid (4). The rubber molecules (1) are separated by the diffusion of the supercritical fluid (5), but inhibited from further separation by the three dimensional network of chemical cross-links (3). As the restraining influence on the rubber molecules, the cross-links will be under their maximum strain when the rubber is at equilibrium swell.

A further embodiment of this invention permits the equilibrium swell of the outer surface of the vulcanised rubber particulate only. As the supercritical fluid will migrate through the outer surface towards the centre of each vulcanised rubber particle, the outer surface of each vulcanised rubber particle will reach a state of equilibrium swell before such a state is achieved at the centre of the rubber particle. Subsequent processing described herein within the scope of the invention will thereby achieve de-vulcanisation of the outer crust of each rubber particle, allowing the retention of the rubber's original physical properties within the core of each rubber particle. Later inclusion of the treated particulate rubber as an additive to a new rubber mix will permit chemical cross-linking between the de-vulcanised outer surface of the rubber and the new rubber matrix.

The surface depth of de-vulcanisation will vary depending on the particle geometry but will typically involve significant de-vulcanisation (i.e. breakage of greater than 10%, for example greater than 30% or greater than 50% of sulphur containing bonds in a region) to a depth of less than 20% of the largest particle diameter, for example less than 10%, such as less than 5%.

A further embodiment of this invention exploits the excellent solvent and dissipation properties of supercritical fluids to act as a carrier for active additives such as chemical de-vulcanising agents, examples of which are diphenyl disulphide and thiol acid. The use of such additives will assist with the processes of de-vulcanisation through chemical cleavage of a proportion of sulphur cross-links prior to physical cleavage through the preferred embodiment of this invention A further embodiment of this invention again exploits the excellent solvent and dissipation properties of supercritical fluids and its ability to extract low molecular weight materials commonly found within typical vulcanised rubber compounds, examples of which being monomers, oils, waxes and soaps which, individually or in combination migrate to the surface of vulcanised rubber and act to form a surface contaminant that reduces or destroys both physical and chemical bonds at the rubber/adhesive interface. Such extraction of low molecular weight contaminants found within vulcanised rubber will in itself serve to improve the compatibility of vulcanised rubber into a new rubber mix matrix, by improving interface wettability, leading to a greater intimacy of surface contact.

Figure 3:
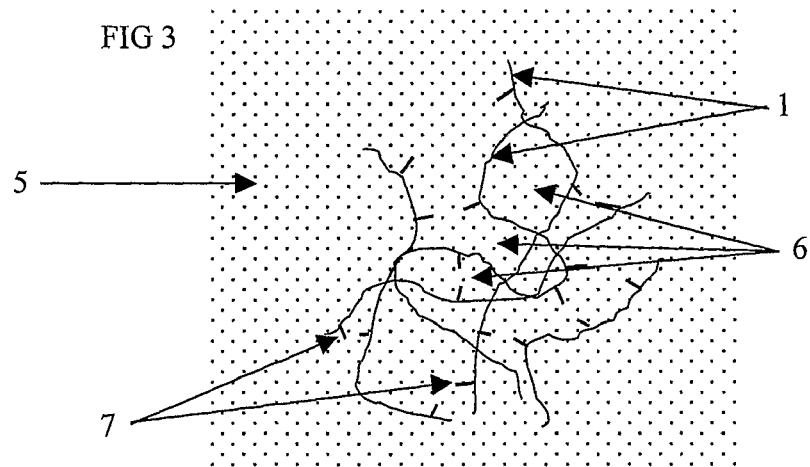
FIG. 3 Shows a representation of de-vulcanised rubber molecules and broken cross-links after a rapid decompression of the supercritical fluid causes a three dimensional separation of the molecules beyond the extendable limit of the cross-links, thereby causing the cross-links to fracture.

Once equilibrium swell is achieved, the internal pressure of the pressure vessel is rapidly dropped to a pressure lower than the optimum processing pressure and preferably to a pressure lower than the supercritical pressure of the supercritical fluid, as demonstrated by FIG. 3. The supercritical fluid around the vulcanised rubber will revert to a gaseous state (5), causing a sudden pressure difference between the autoclave chamber pressure and the internal pressure within the vulcanised rubber, due to supercritical fluid remaining partially trapped between the rubber molecules. In an attempt to achieve a pressure equilibrium, the supercritical fluid between the rubber molecules will rapidly expand (6), forcing separation of the rubber molecules (1) beyond the restraining capability of the cross-links, causing the cross-links to fracture (7). Control of the depressurisation is critical to avoid explosive decompression tearing the rubber apart, as used to good effect by Deeb, Victor M and Rouse, Michael W[3] who have exploited this affect in their patented process for the deliberate size reduction of particulate materials, including rubbers, by allowing a rapid decompression to atmospheric pressure. An aspect of the present invention is the control of the rapid three dimensional decompression expansion of the swollen vulcanised rubber to a level beyond the breakage point of the chemical cross-links, but less than would be required to cause large scale breakage of the long chained rubber molecules.

In controlling the rapid decompression of the vulcanised rubber in order to maximise the breaking of the sulphur-containing linkages whilst avoiding macroscopic structural damage to the rubber (i.e. as would result from explosive decompression), the absolute initial and final pressure values are less important than the absolute pressure difference of the decompression step.

The structure of the vulcanised rubber may be considered to be a system of entangled rubber molecules, in which the molecules are cross-linked by sulphur-containing groups, effectively forming free volume into which the supercritical fluid may penetrate.

Following a reduction in external pressure, the internal pressure of a vulcanised rubber particle can be released in a number of ways:
  (i) diffusion of the fluid from the rubber particle;
  (ii) reorganisation of the rubber polymer chains to allow the fluid to leave the free volume more quickly;
  (iii) breaking of the sulphur-containing bonds to allow the free volume to expand thereby reducing the internal pressure of the particle;
  (iv) macroscopic damage to the rubber structure forming pores that allow the pressure to escape.

The timescale for attaining equilibrium swell of a 0.5 mm diameter vulcanised rubber particle due to diffusion of the supercritical fluid into the particle is of the order of 10 minutes. On this timescale, the depressurisation step is rapid and results in the rubber particle experiencing an internal pressure equal to that of the pressure drop. Therefore, diffusion of the gas out of the particle will be a relatively minor component of the pressure equalisation process unless the pressure difference between the inside of the rubber particle and the external system is small enough that a negligible amount of cross linkages are broken.

As seen previously, the bond energies of the sulphur containing cross links are smaller than those of the polymeric carbon-carbon bonds (27-60 Kcal mol$^{-1}$ vs 93 Kcal mol$^{-1}$). Therefore, the degree to which the different bonds are broken depends in part on the initial pressure difference between the inside of the vulcanised rubber particle and the external system.

During the initial loading of the vulcanised rubber with the supercritical fluid, equilibrium swell is attained when the expansion of the free volume within the rubber is equally constrained by the sulphur-containing cross links.

Following the depressurisation step, if the pressure difference is sufficiently low, the strength of the cross links will be sufficient to retain the internal connectivity of the rubber and the fluid will diffuse out of the particle, with perhaps some rearrangement of the polymer particles to allow more rapid equilibration.

Following the initial reduction of external pressure, the largest effect of the pressure difference will be experienced by the free volume closest to the surface of the rubber particle. Provided the pressure drop is sufficiently large to break some of the sulfur-containing bonds that constrain this region of the free volume, the free volume will then be free to expand to an extent determined by the elasticity of the rubber, in order to reduce the pressure difference between the interior of the free volume and the external system.

As the region of free volume closest to the surface expands, the underlying layer of free volume will experience an increase in pressure difference to a level slightly below that initially experienced by the free volume closest to the surface. If this pressure difference is still large enough to break some of the sulfur-containing bonds constraining the expansion of this region of free volume, then it will also expand to reduce the pressure difference between it and the free volume closest to the rubber surface.

This process continues with successive layers of free volume expanding due to breaking of cross-linkages until the pressure difference between the adjacent layers is no longer sufficient to break even the weakest polysulphide bonds. At this stage, the internal and external pressures will equilibrate due to diffusion of the fluid from the particle to the external system.

From the above, it may seem that a minimum pressure drop is required to break the weakest bonds constraining the expansion of the free volume in the outer layer (polysulphide bonds). If the pressure drop is less than this minimum value, the fluid will simply diffuse out of the rubber particle without changing its structure.

If the pressure drop is just above the minimum value to break the polysulphidic bonds, some of the weakest polysulphide bonds in the outer region of free volume will break allowing expansion of the outer region to a level such that the pressure in this outer region of free volume reduces to a level below that required to break any remaining polysulphide bonds. The next layer of free volume may then also experience a corresponding pressure difference sufficient to break some of the weaker polysulphide bonds. Because the outer layer remains at a slightly higher pressure than the external system, the pressure difference between the next innermost layer and the outer layer is less than the initial pressure difference between the free volume of the outer layer and the external system. This means that the pressure difference experienced by successive layers of free volume decreases on moving inward from the surface layer and so this pressure difference will eventually be insufficient to break even the weakest polysulphide bonds. In addition, the expansion of free volume in the inner layers is hindered by the presence of the layer immediately above since the expansion of the other layer will pressurise the layer above, thereby moderating the expansion of the inner layer.

In order to increase the proportion of sulfur-containing cross links broken, the pressure drop may be increased. As the pressure drop increases, more of the sulphur-containing cross links in the outer layer will break, in addition, the depth of penetration into the particle will also increase. Both of these factors will initially increase the yield of the de-vulcanised rubber from the depressurisation step.

As the size of the pressure drop increases further, the resulting pressure difference will become sufficient to begin to break the stronger sulfur-containing cross links such as the C—S—S—C disulphide bond and then the C—S—C monosulphide bond. At this stage, the yield will still be increasing as the pressure drop increases. However, eventually the pressure drop will be sufficiently large that, in order to equilibrate the internal and external pressure, the de-vulcanised rubber will begin to suffer macroscopic damage. At this stage, the yield will begin to decrease due to the fluid creating microscopic pores in the particle from which it can escape, thereby relieving the pressure on the cross links. As mentioned above the pressure drop takes place on a timescale that is rapid compared to the rate of diffusion of the supercritical fluid from the particle in order to minimise internal pressure loss by diffusion.

The rate of pressure drop at its greatest rate would be virtually instantaneous and governed by the design of the process, but may advantageously be regulated and controlled as a function of time.

As mentioned above, following a depressurisation step, sulphur-containing bonds in the region of free volume closest to the surface of the rubber particle are broken allowing this region of free volume to expand until the pressure within the region reduces to a level that is no longer sufficient to break the weakest polysulphide bonds constraining further expansion of the free volume in this region. It is possible to increase the number of bonds broken by increasing the size of the pressure drop. However, this will eventually result in a decrease in yield due to macroscopic damage to the structure of the rubber taking place.

However, by controlling the rate at which the external pressure is reduced, it is possible to maintain a pressure difference between the external system and the free volume in the particle that is sufficiently high to allow further sulphur-containing bonds to be broken once the initial expansion of the outer region of free volume has taken place whilst minimising any damage to the structure of the rubber.

Since the severity of the decompression experienced by the particle is reduced by reducing the rate at which the pressure drops, a larger pressure difference may typically be used for embodiments in which reduction of pressure from its initial value to its final value takes place over a longer timescale.

The pressure drop is typically greater than 2 bar, for example greater than 5 bar, such as greater than 10 bar or greater than 15 bar. The pressure drop would also typically be less than 300 bar, such as less than 200 bar or less than 100 bar. The pressure drop may also be less than 50 bar, such as less than 30 bar, for example less than 25 bar.

In embodiments in which the pressure drop takes place over a short timescale, for example less than 5 seconds, the pressure drop is generally selected to be towards the lower end of this range. In general, this pressure drop is less than 100 bar, such as less than 50 bar, for example less than 30 bar, or less than 25 bar. The pressure drop is also generally greater than 2 bar, for example greater than 5 bar, such as greater than 10 bar, or greater than 15 bar.

In general the pressure drop would take place over a timescale of greater than 0.5 seconds, for example greater than 1 second, such as greater than 2 seconds. The pressure drop would also typically take place over a timescale of less than 60 seconds, for example less than 30 seconds, such as less than 15 seconds or less than 5 seconds.

In embodiments in which the pressure drop takes place over a timescale of less than 60 seconds, the pressure drop may take place over a timescale of greater than 5 seconds, for example greater than 15 seconds, such as greater than 30 seconds.

In embodiments in which the pressure drop takes place over a timescale of less than 30 seconds, the pressure drop may take place over a timescale of greater than 5 seconds, for example greater than 15 seconds.

In embodiments in which the pressure drop takes place over a timescale of less than 15 seconds, the pressure drop may take place over a timescale of greater than 5 seconds.

In embodiments in which the pressure drop takes place over a timescale of less than 5 seconds (for example less than 4 seconds or less than 2 seconds), the pressure drop may take place over a timescale of greater than 0.5 seconds, for example greater than 1 second.

In most embodiments, the time taken for the pressure to drop from its initial value to its final value would be less than $1/10^{th}$ of the time required for the pressure to equilibrate by diffusion, for example less than $1/50^{th}$, such as less than $1/100^{th}$ or less than $1/500^{th}$.

It is therefore possible to optimise the yields by selecting the size and rate of the pressure drop. However, at the highest yield, it is likely that some damage is being done to the structure of the rubber.

In a further embodiment of the invention, the yield of de-vulcanised rubber may be improved by employing a multistage process in which more than one pressure drop at the preferred rate is employed. This multistage process comprises applying a controlled pressure drop and rate as in the single stage process and then applying a further controlled pressure drop and rate. This process may be repeated as required.

In this way, further sulphur-containing cross linkages may be broken whilst minimising damage to the structure of the rubber, thereby increasing the yield of de-vulcanised rubber.

It is preferred that following each pressure drop, equilibrium swell is attained before the next pressure drop is applied. This reduces the pressure drop required to break the sulphur-containing bonds because it minimises the expansion of the free volume required to put strain on the cross linkages. For this reason, it is further preferred that the overall pressure range is selected so that the supercritical fluid solubility parameter remains as close as possible to that as the vulcanised rubber. This allows the swelling of the rubber to be maximised during each stage. If the solubility parameter of the rubber is too high to be conveniently achieved without the use of excessively high pressure, the initial pressure of the multistage process may be selected so that following the initial pressure drop, the solubility parameter of the supercritical fluid remains within 2 $MPa^{1/2}$ of the initial solubility parameter, preferably within 1 $MPa^{1/2}$, more preferably within 0.5 $MPa^{1/2}$.

It is also preferred that the fluid remains supercritical during the multistage process to allow more rapid equilibrations between stages.

The larger the number of pressure drop steps the larger the yield of de-vulcanised rubber. However the successive additional yield decreases with each step. In addition the process time increases as the number of depressurisation steps increases. The typical number of pressure drops in the multistage process will therefore usually be fewer than 10, for example fewer than 5 such as 2-4.

The size and rate of each pressure drop is selected to minimise damage to the rubber, whilst being large enough to cause breakage of sulphur-containing cross linkages.

In embodiments where the pressure drop takes place relatively quickly (for example over a timescale of less than 5 seconds) the pressure drop will typically be greater than 2 bar, for example greater than 5 bar, such as greater than 10 bar. The pressure drop will also usually be less then 30 bar, for example less than 25 bar, such as less then 20 bar or less than 15 bar.

In embodiments where the pressure drop takes place relatively slowly, (for example over a timescale of 5 to 60 seconds) the pressure drop will typically be greater than 10 bar, for example greater than 15 bar, such as greater than 20 bar or greater than 25 bar. The pressure drop will also usually be less than 300 bar, such as less than 200 bar or less than 100 bar. The pressure drop may also be less than 50 bar.

In addition, as described previously, the initial temperature of the fluid should be selected so that, in embodiments where it is required that the fluid remains supercritical, any temperature reduction associated with the pressure drop should be small enough to enable the fluid to remain supercritical.

Following the de-vulcanisation process of the invention, the product may be employed in general rubber applications or alternatively, further processed, for example by solvent extraction, in order to separate the de-vulcanised material from the remaining vulcanised material in the rubber material.

Solvent extraction may be carried out using any solvent which selectively removes the de-vulcanised rubber from the rubber material. The solvent preferably exhibits a solubility parameter in the range 15 to 18 $MPa^{1/2}$ for non-polar rubbers and may for example be toluene, and a range of 18 to 24 $MPa^{1/2}$ for polar polymers and may for example be methyl ethyl ketone.

The de-vulcanised rubber of the invention comprises a number of advantageous properties.

For example, higher addition levels of the de-vulcanised rubber as an additive to a new rubber compound can be made, compared to non-de-vulcanised rubber, while retaining superior processing properties and vulcanised physical properties.

The process of the invention increases the level of solvent extractable material within the de-vulcanised rubber when compared with non-de-vulcanised rubber. The solvent extractable material taking the form of a low viscosity polymer, such as de-vulcanised rubber, having visco-elasticity and tack. The presence of this low viscosity polymer within the de-vulcanised rubber contributes to easier incorporation of the de-vulcanised rubber into a new rubber mix, thereby permitting higher addition levels to a new rubber mix when compared with non-de-vulcanised rubber.

In addition, the de-vulcanised rubber exhibits increased chemical activity with respect to free radicals, when compared to vulcanised rubber, thereby permitting chemical cross linking within a new rubber matrix. This gives enhanced vulcanised physical properties to the compound when compared to the use of equivalent addition levels of vulcanised rubber.

Figure 4:
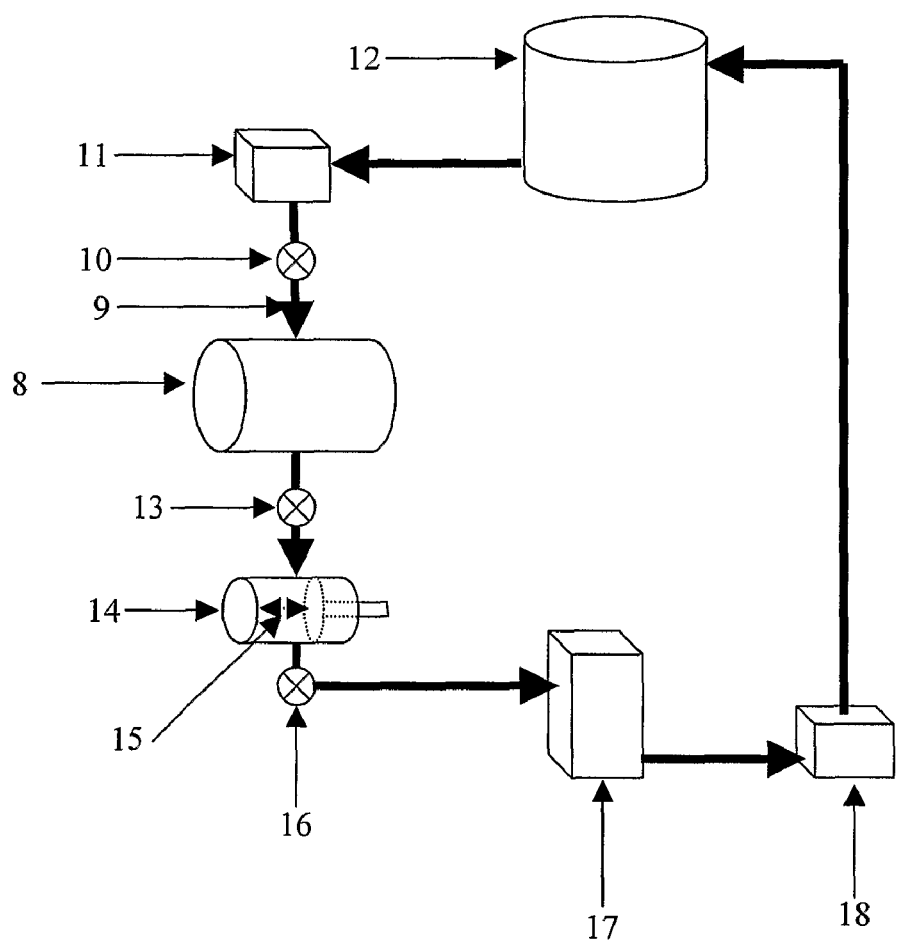
FIG. 4 Shows a representation of the processing equipment in which to carry out the functional operations of the invention.

FIG. 4 shows the basic components of the process necessary to carry out decompression de-vulcanisation as described within the process of the present invention. The pressure vessel (8) would preferably be capable of operating between temperatures of 20° C. to 175° C. while maintaining a temperature control of +/−1° C., and preferably capable of withstanding internal operating pressures from 0 bar to 200 bar. Vulcanised rubber, preferably in particulate form, and preferably being of a particulate size of 0.425 mm to 0.18 mm across its largest dimension is loaded into, and sealed within the pressure vessel. The volume of vulcanised rubber loaded into the pressure vessel must be small enough to allow the vulcanised rubber to reach equilibrium swell, and to allow further expansion due to subsequent rapid decompression. The level of swell achievable by a vulcanised rubber will vary considerably depending upon the components used within the rubber formulation. The type of base polymer, different fillers and loadings, and the type and density of cross-links will all affect the swell behaviour of vulcanised rubber in a solvent. Tests will therefore be necessary to establish the level of swell achievable by any given type, batch, grade or quality of vulcanised rubber. It is normal however that the initial volume of vulcanised rubber within one processing batch will be less than 20% of the internal volume of the pressure vessel.

The pressure vessel (8) would be served by a inlet pipe (9) and non-return valve (10) suited to the delivery of gasses and fluids, through which a gas or a liquid, being preferably a liquid and further, being preferably liquid carbon dioxide, is pumped from a storage vessel (11) by a suitable high pressure pump (12) into the pressure vessel up to or beyond the supercritical pressure of the gas or liquid which, for carbon dioxide is a pressure of 7.4 MPa. Once the supercritical pressure is achieved, heaters within the pressure vessel increase the temperature of the liquid gas up to or beyond the supercritical temperature which for carbon dioxide is 31.1° C., causing the liquid gas to change into a supercritical fluid. The supercritical fluid will completely fill the pressure vessel and will come into intimate contact with the vulcanised rubber. The pressure within the pressure vessel will then be increased as necessary by an operator skilled in the art, to achieve the optimum solubility performance for the vulcanised rubber being processed. Pressure and temperature is maintained to preserve optimum conditions for a period sufficient to achieve equilibrium swell.

Once the vulcanised rubber has reached a state of equilibrium swell, a quick release valve (13) is opened permitting the rapid escape of the pressurised supercritical fluid, and a consequent sudden drop in the internal pressure of the pressure vessel. Control of the pressure drop is achieved by not venting to atmosphere, but rather by venting to a receiver (14) of adjustable internal volume (15), having the effect of suddenly increasing the internal volume of the pressure vessel. It is an aspect of the present invention that the receiver has an adjustable internal volume, determined by the use of different sized receivers, or preferably by the use of an adjustable sealed internal plate. The volume of the receiver dictates the level of pressure drop within the pressure vessel, and therefore the extent of the three dimensional expansion of the processed rubber. The larger is the internal volume of the receiver, the greater will be the pressure drop and the extent of the three dimensional expansion experienced by the processed rubber.

A further aspect of the present invention is that once the rapid pressure drop has been achieved, a further slow pressure drop is controlled by opening a bleed outlet valve (16) on the receiver, allowing a controlled pressure drop of gas to atmosphere, or preferably through a cooler (17) to convert the gas back to a liquid for pumping back (18) to the storage vessel (11), permitting closed loop recycling of the processing gas.

The rate of the slow pressure drop must be controlled to permit the release of supercritical fluid from within the processed rubber without causing physical damage to the processed rubber, and must preferably match the rate of diffusion of the supercritical fluid from the processed rubber as it converts to gas.

When the pressure within the pressure vessel is reduced to a pressure equal to atmospheric pressure, the pressure vessel may be opened, and the processed rubber, now in a predominantly de-vulcanised state may be removed.

De-vulcanised rubber resulting from the process described within the embodiments of this invention can be processed by someone skilled in the art of using conventional rubber mixing, forming and curing technologies, as commonly found within the rubber processing industry, including formulating, mixing, milling, calendering, extrusion, compression moulding, transfer moulding, injection moulding, fabrication and pressureless curing techniques. Reuse of the fully de-vulcanised rubber may be achieved by mixing the de-vulcanised rubber with a cure system consisting of activators, accelerators and a cross-linking agent such as sulphur, selected by someone skilled in the art to achieve desired processing and curing characteristics. Other ingredients such as fillers, processing oils, plasticizers, and miscellaneous protective systems may also be added as required to achieve desired physical and processing properties. A further use of the de-vulcanised rubber is as an additive into a new rubber mix, acting as a partial replacement for virgin compounding ingredients including polymer, reinforcing filler and non-reinforcing filler. Use of the de-vulcanised rubber may be achieved in this way by mixing the de-vulcanised rubber as a proportion of the whole mix with conventional ingredients such as polymer, reinforcing and non-reinforcing fillers, process oils, process aids, miscellaneous protective systems and a cure system consisting of activators, accelerators and a cross-linking agent such as sulphur, selected by someone skilled in the art to achieve desired processing and curing characteristics.

Preparation of the compound can be carried out in a conventional mixer, e.g. an internal mixer having tangential rotors or intermeshing mixing elements. Other kinds of internal mixer or other mixer may be used; it is a feature of the present technology that special equipment is generally not required. Equally, the sequence of addition of compound ingredients may be generally conventional.

Fill factor and addition times can be established in line with conventional skill to suit the machine in which the compound is mixed. Dump temperature should be controlled to maintain scorch safety, e.g. to below 110° C. The temperature in the mix during mixing (arising primarily from shear forces) is typically between 100° C. and 150° C. Mixing time is typically between 1 and 8 minutes.

Once mixed, the compound containing the dispersed rubber crumb forms a coherent processable batch which can be discharged from the mixer onto a suitable processing apparatus such as a two-roll open mill. In line with conventional practice, further dispersion of the components can be achieved by cutting and blending the mixed batch on the two roll mill.

From a two roll mill, the mixed batch can be passed as a continuous coherent sheet which is able to support its own weight. This may then be processed in a conventional way, e.g. being passed through an anti-tack dip and allowed to cool before removal from the process and subsequent forming e.g. by compression moulding. Typically this may involve processing into a sheet of predetermined thickness and width using a calendar. This gives the necessary accurate dimensions for subsequent moulding in a compression press, either by continuous feed of the calendered sheet or by the use of moulding blanks cut from the calendered sheet. Typical moulding is carried out at a temperature between 130° C. and 180° C. using a closing force sufficient to fully form the desired moulded product.

EXAMPLE 1

A sample of rubber dust having a stated particle size of 0.425 mm (40 mesh), being derived from end of life tyre by conventional ambient grinding techniques is placed in a pressure vessel suited to sustaining conditions appropriate for supercritical fluids. Liquid carbon dioxide is pumped into the pressure vessel to a pressure of 7.4 MPa. The temperature within the pressure vessel is increased to 36° C. The rubber dust remains within the supercritical carbon dioxide for a period sufficient to allow for equilibrium swell 10 be achieved. A quick release valve is opened to a receiver vessel of a size that permits a rapid pressure drop (over a timescale of approximately 1 second) within the pressure vessel, such that each particle of rubber dust experiences a rapid three dimensional expansion to a volume of 50% greater than its swollen volume at equilibrium swell. The remaining pressure within the pressure vessel is allowed to slowly bleed away until normal atmospheric pressure is reached, at which point the pressure vessel is opened and the de-vulcanised rubber is removed.

EXAMPLE 2

The method of Example 1 is followed except that the period of time for swelling of the rubber dust in the supercritical carbon dioxide is reduced so that only the outer surface of each rubber particle is swollen. Subsequent rapid decompression of the supercritical carbon dioxide affects only the swollen outer shell of each rubber particle permitting the vulcanised rubber properties to be retained within the core. The resulting product is a particulate rubber with a de-vulcanised surface capable of cross-linking within a new rubber matrix.

EXAMPLE 3

Figure 5:
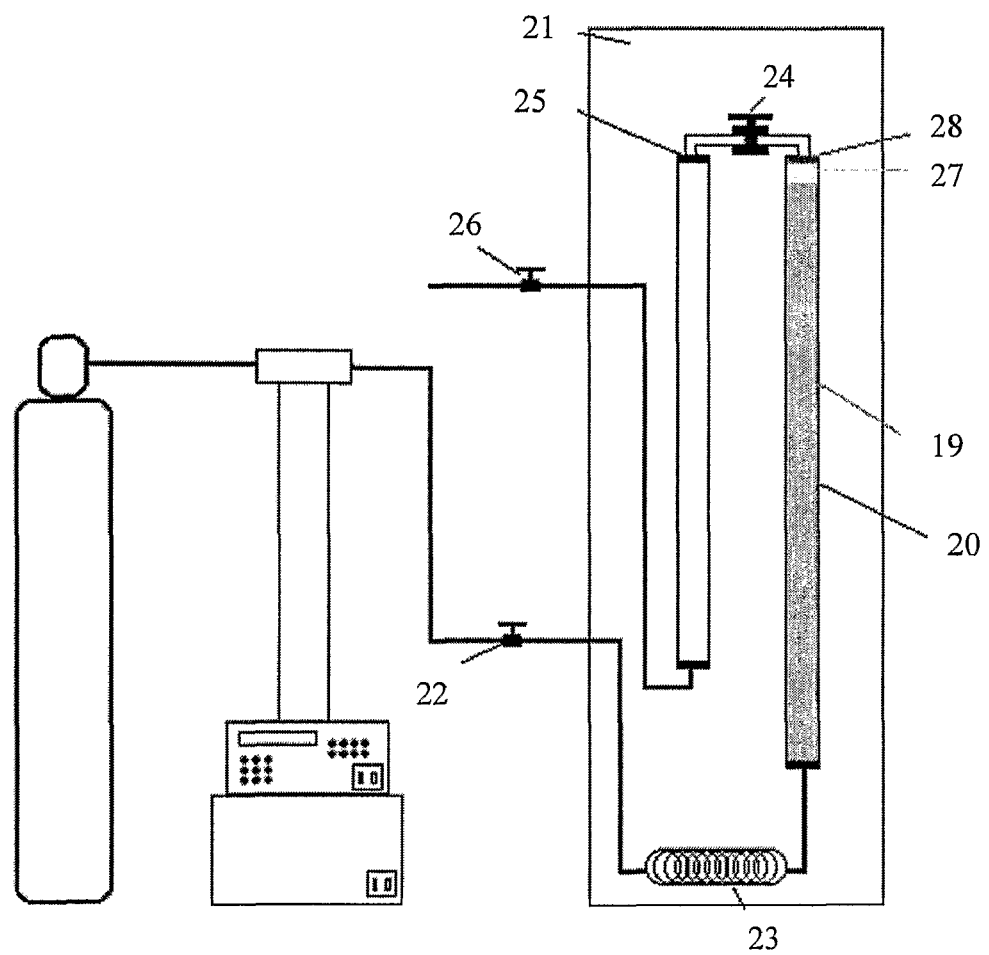
FIG. 5 Shows a further process schematic as used in the process of Example 3.

Using an apparatus as shown in FIG. 5, a 10 gram sample of commercially available rubber dust (19) having a stated particle size of 0.425 mm (40 mesh), being derived from end of life tyre by conventional ambient grinding techniques was placed in a pressure vessel (20) within an oven (21) suited to sustaining conditions appropriate for supercritical fluids. Carbon dioxide was pumped into the pressure vessel through a shutoff valve (22) and preheater coil (23) and stabilized to a supercritical condition having a pressure of 110 bar and a temperature of 45° C. The rubber dust (19) remained within the supercritical carbon dioxide for a period of 30 minutes, being of sufficient time to allow equilibrium swell of the rubber dust particles to be achieved. A quick release ball valve (24) was opened to a receiver vessel capped by a 25 μm steel frit (25) to permit a rapid pressure drop within the pressure vessel (20) of 5%, causing the particles of rubber dust (19) to experience rapid three dimensional expansion to a volume greater than its swollen volume at equilibrium swell. The remaining pressure within the pressure vessel was allowed to slowly bleed away through a vent valve (26) until normal atmospheric pressure was reached, at which point the pressure vessel (20) was opened and the de-vulcanised rubber was removed. A layer of glass wool (27) and wire mesh (28) was used to retain the rubber particles in the pressure vessel (20) during the depressurisation process.

On removal from the pressure vessel, the treated rubber was extracted in toluene for 24 hours to establish the percentage change of extractable material contained within the rubber particles. The method employed to remove extractable material from the rubber dust is standard laboratory procedure and known to those skilled in the art: To a clean, round bottom flask containing some anti-bumping granules (marble chips to aid smooth boiling) a known and recorded mass of treated rubber dust is added (wt rubber). To this is then added a known and recorded mass of toluene (tot wt tol). The flask is then fitted with a condenser and refluxed for 24 hrs at the boiling point of the toluene.

The solution is then cooled and an aliquot ~50 mls is filtered to remove the rubber dust particles.

A clean vial of volume 7 ml is accurately weighed (4 decimal place) and its mass recorded (wt vial).

A sample of the cooled filtered toluene solution is then transferred to the vial and the total mass recorded (+tol). The mass of toluene solution added (wt tol) is calculated from ((+tol)−wt vial).

The vial containing the toluene solution is then placed in a vacuum oven and dried to remove the toluene. After 3 hrs the vial is weighed at 30 minute intervals until consecutive weights are within +/−0.005 g (wt dried).

The mass of residue (wt dry extract) is then calculated as follows (wt dried−wt vial). From this and the known total mass of toluene used (tot wt tol) the total mass of residue in the total mass of toluene (tot residue) is calculated ((wt dry extract×tot wt tol)/wt tol), then from this the % extract is calculated and recorded.

The extraction procedure was repeated with a second sample of rubber dust and the two extraction results averaged:

| | |
|---|---|
| $1^{st}$ extraction result | 8.21% |
| $2^{nd}$ extraction result | 7.97% |
| Average | 8.09% |

The rubber dust de-vulcanisation treatment was then repeated, but with a 10% rapid pressure drop to the supercritical pressure following equilibrium swell of the rubber dust particles. The treated rubber dust was removed from the pressure vessel and extracted in toluene as described giving the following results:

| | |
|---|---|
| $1^{st}$ extraction result | 18.17% |
| $2^{nd}$ extraction result | 19.04% |
| Average | 18.605% |

The rubber dust de-vulcanisation treatment was then repeated, but with a 20% rapid pressure drop to the supercritical pressure following equilibrium swell of the rubber dust particles. The treated rubber dust was removed from the pressure vessel and extracted in toluene as described giving the following results:

| | |
|---|---|
| 1st extraction result | 25.36% |
| 2nd extraction result | 24.65% |
| Average | 25.005% |

The rubber dust de-vulcanisation treatment was then repeated, but with a 30% rapid pressure drop to the supercritical pressure following equilibrium swell of the rubber dust particles. The treated rubber dust was removed from the pressure vessel and extracted in toluene as described giving the following results:

| | |
|---|---|
| 1st extraction result | 16.45% |
| 2nd extraction result | 17.15% |
| Average | 16.80% |

The rubber dust de-vulcanisation treatment was then repeated, but with a 50% rapid pressure drop to the supercritical pressure following equilibrium swell of the rubber dust particles. The treated rubber dust was removed from the pressure vessel and extracted in toluene as described giving the following results:

| | |
|---|---|
| 1st extraction result | 15.07% |
| 2nd extraction result | 13.42% |
| Average | 14.245% |

The rubber dust de-vulcanisation treatment was then repeated, but with a 100% rapid pressure drop to the supercritical pressure following equilibrium swell of the rubber dust particles. The treated rubber dust was removed from the pressure vessel and extracted in toluene as described giving the following results:

| | |
|---|---|
| 1st extraction result | 8.98% |
| 2nd extraction result | 8.81% |
| Average | 8.895% |

As a control, extraction testing of non-treated rubber dust was carried out giving the following results:

| | |
|---|---|
| 1st extraction result | 7.30% |
| 2nd extraction result | 7.31% |
| Average | 7.305% |

Figure 6:
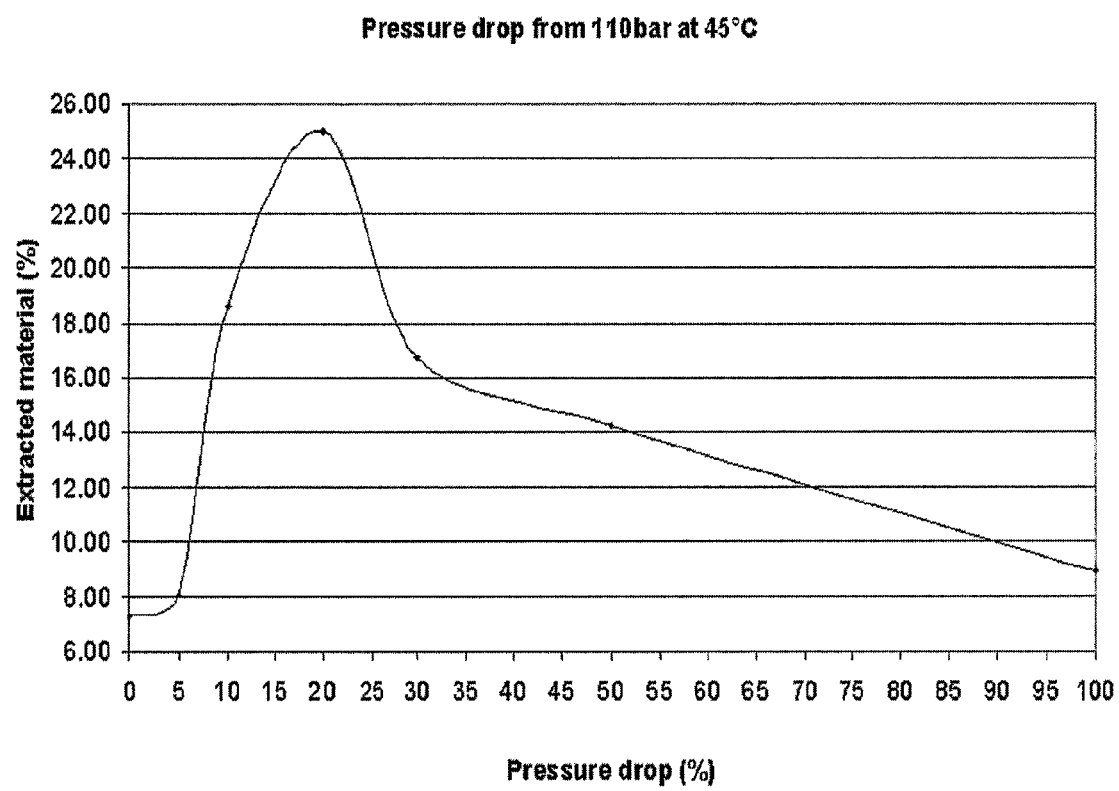
FIG. 6 Shows a representation of the percentage of extracted devulcanised material obtained as a function of the percentage pressure drop from 110 bar.

These results are expressed graphically in FIG. 6. The results demonstrate significant changes to the level of extractable material obtained from the rubber dust after treatment, with a clear optimum level of rapid decompression under the chosen conditions of the process of around 20%. The extracted material once dried of toluene was inspected and found to be a black tacky visco-elastic solid, characteristics common of un-vulcanised rubber. The extracted material obtained from the control sample comprised predominantly of hydrocarbon oil and wax, of the type commonly added to tyre compounds to aid processing and give environmental protection.

EXAMPLE 4

To process a quantity of commercially available 40 mesh rubber dust in sufficient quantities to evaluate its effect in new rubber compounds, a scaled up version of the apparatus used to carry out the evaluation described in Example 3 was used. Using $CO_2$ supercritical conditions of 110 bar and 45° C. it was first necessary to confirm the time required to achieve a condition of equilibrium swell. This was performed using a stainless steel tube with the outlet end connected to a quick release valve for pressure release to a receiver cell. The tube was placed into an oven and connected to a $CO_2$ supply. The oven and tube were then equilibrated at 45° for 2 hours prior to adding $CO_2$. Once pressurised with $CO_2$ the flow rate into the cell was monitored and recorded until the flow was stable i.e. any flow observed was being caused by thermal variance between the pump and the cell in the oven. The test was then repeated with a 80 gram sample of the rubber particles. The observed flow rate as a function of time is shown in FIG. 7.

Figure 7:
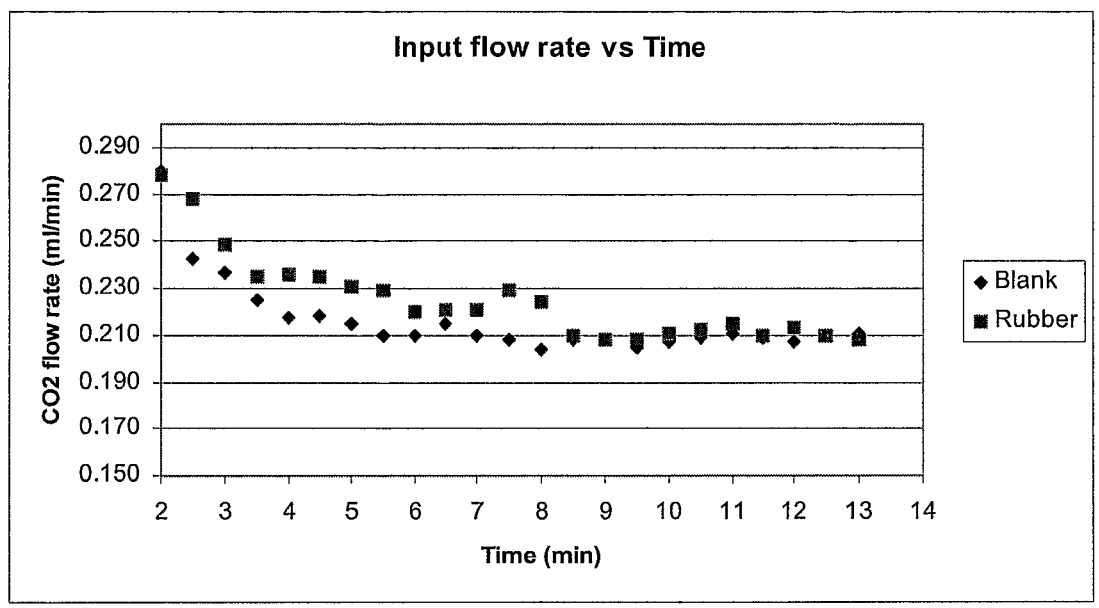
FIG. 7 Shows a representation of input flow rate vs time for $CO_2$ pumped into a pressure cell (as used to determine equilibration time for the rubber swelling process).

From FIG. 7, it can be seen that for a thermally stable sample between 8 and 10 minutes is required to swell the rubber particles (the point at which the flow in both the blank and rubber tests were the same). Based on this it was decided that subsequent test runs to generate larger volumes of de-vulcanised rubber dust would be allowed to equilibrate for a minimum of 30 minutes prior to decompression to allow for complete thermal stability and $CO_2$ loading.

Thirteen runs each of approximately 80 grams were run as shown:

| Run | Sample (g) | Temp | Start press | End Press | Drop % |
|---|---|---|---|---|---|
| 1 | 79.16 | 45° C. | 110 bar | 89 bar | 19.09 |
| 2 | 78.38 | 45° C. | 110 bar | 89 bar | 19.09 |
| 3 | 74.29 | 45° C. | 110 bar | 89 bar | 19.09 |
| 4 | 79.04 | 45° C. | 110 bar | 89 bar | 19.09 |
| 5 | 78.07 | 45° C. | 110 bar | 89 bar | 19.09 |
| 6 | 79.36 | 45° C. | 110 bar | 89 bar | 19.09 |
| 7 | 78.6 | 45° C. | 110 bar | 89 bar | 19.09 |
| 8 | 78.68 | 45° C. | 110 bar | 89 bar | 19.09 |
| 9 | 80.56 | 45° C. | 110 bar | 89 bar | 19.09 |
| 10 | 76.88 | 45° C. | 110 bar | 89 bar | 19.09 |
| 11 | 75.49 | 45° C. | 110 bar | 89 bar | 19.09 |
| 12 | 74.07 | 45° C. | 110 bar | 89 bar | 19.09 |
| 13 | 70.37 | 45° C. | 110 bar | 89 bar | 19.09 |

The total sample weight processed was 1002.95 g. Extraction tests were performed as described in Example 3 yielding results of 18.37 and 18.59% of extractable material on duplicate samples.

EXAMPLE 5

To test the usefulness of the present invention as a significant component additive in a typical commercial rubber compound, the rubber dust de-vulcanised in Example 4, having an average extraction of 18.48% was mixed into a typical passenger tyre retread compound at a level of approximately 25% and tested for a range of rheological and physical properties. For the purpose of comparison and evaluation both the standard formulation and a version using 25% of non-treated rubber dust were mixed and subjected to the same regime of tests.

The ingredient levels used for each of the formulations are given in the following table:

| Ingredients | Standard % | De-vulc Dust % | Std. Dust % |
|---|---|---|---|
| Polymers | 33.51 | 26.99 | 26.99 |
| Std. Dust | 5.93 | 0.00 | 24.30 |
| De-vulc. Dust | 0.00 | 24.30 | 0.00 |
| Fillers | 34.02 | 27.38 | 27.38 |
| Activator System | 1.34 | 1.08 | 1.08 |
| Processing Aids | 23.13 | 18.60 | 18.60 |
| Protective System | 0.61 | 0.49 | 0.49 |
| Accelerator System | 0.62 | 0.49 | 0.49 |
| Curative | 0.83 | 0.67 | 0.67 |

Where;

Polymers: Styrene butadiene rubber, natural rubber and polybutadiene

Fillers: Carbon black and calcium carbonate

Activator system: Zinc oxide and stearic acid

Processing aids: Aromatic oil and aliphatic resin

Protective system: Paraphenylene diamine and paraffin wax

Accelerator system: CBS, MBTS and TMTD

Mixing was carried out in a laboratory scale Banbury internal mixer having tangential rotors and a mixing capacity of 3 kg. Standard two stage mixing cycles based on time were used for each compound using a common batch weight, and the temperature at the end of each cycle recorded. The process followed the described routine;

Stage 1

| Action | Time from start (minutes) |
|---|---|
| Add polymers and rubber dust | 0.0 |
| Ram down | 0.0 |
| Ram up, add fillers and process aids, ram down | 1.0 |
| Ram up, add activators and protective system, ram down | 3.0 |
| Ram up, ram sweep down, ram down | 4.0 |
| Drop batch from mixer | 4.50 |

Transfer to 18 inch two roll mill. Band onto mill and cut and blend for 2 minutes. Sheet off the mill and allow the rubber to cool for 30 minutes.

Stage 2

| Action | Time from start (minutes) |
|---|---|
| Return batch to mixer | 0.0 |
| Ram down | 0.0 |
| Ram up, add accelerators and sulphur, ram down | 0.5 |
| Ram up, sweep ram, ram down | 1.5 |
| Drop batch from mixer | 2.0 |

Transfer to 18 inch two roll mill. Band onto mill and cut and blend for 2 minutes. Sheet off the mill and allow the rubber to cool.

Observations

Standard compound stage 1 drop temperature: 82° C.

De-vulc compound stage 1 drop temperature: 84° C.

Non-treated compound stage 1 drop temperature: 102° C.

Standard compound stage 2 drop temperature: 62° C.

De-vulc compound stage 2 drop temperature: 63° C.

Non-treated compound stage 2 drop temperature: 92° C.

Milling Behaviour

Standard compound: Banded onto the mill and handled well.

De-vulc compound: Banded onto the mill and handled well.

Non-treated compound: Dry and crumbly, would not band or handle.

The difference in final mixing temperatures between the compounds containing the de-vulcanised rubber dust and the standard rubber dust, and the behaviour of each of the compounds on the two roll mill clearly demonstrated that the de-vulcanisation process had had a beneficial effect. The effect observed was indicative of an improved compatibility within the new rubber mix, as might be expected with the presence of de-vulcanised or partially de-vulcanised rubber. This conclusion was reinforced by the close similarity of the compound containing de-vulcanised rubber dust to the mixing behaviour of the standard compound.

All mixes were allowed to rest at 23° C. for 24 hours before rheological testing and the vulcanisation of test pieces. Standard rheological tests common to the rubber industry were carried out, namely Mooney viscosity (ML1+2) at 100° C., Mooney scorch (ML1+10) at 140° C. and cure characteristics using an ODR2000 rheometer at 150° C.

Vulcanised test pieces for a range of physical tests were prepared by compression moulding at 148° C. for 20 minutes. All moulded test pieces were rested for 24 hours at 23° C. before testing was carried out to recognised international standards known to the rubber industry. The test results were recorded as follows:

Rheology

| Compound Ref. | Mooney Scorch ML1 + 10@140° C. | Mooney Viscosity ML1 + 2@100° C. | Rheometer ODR2000 T90@150° C. |
|---|---|---|---|
| Specification | 6 +/− 2 (mins) | 38 +/− 5 | 6.6 +/− 1.5 (mins) |
| Standard compound | 6.5 | 36 | 7.25 |
| De-vulcanised compound | 4.5 | 47 | 6.4 |
| Non-treated compound | 4 | 66 | 5.83 |

Physical Properties

| Compound Ref. | Hardness (IRHD) | Specific Gravity (g/cm³) | Tensile Strength (kg/cm²) | Elongation @ Break (%) | Modulus @300% (kg/cm²) | Tear Strength (kg/cm) | Resilience (%) | DIN Abrasion (mm³ volume loss) |
|---|---|---|---|---|---|---|---|---|
| Specification | 64 +/− 2 | 1.165 | 115 (min) | 400 (min) | 80 (+/−5) | 48 (min) | 44 (+/−5) | 150 (max) |
| Std compound | 65 | 1.162 | 124 | 425 | 78 | 51 | 46 | 146 |
| De-vulc compound | 64 | 1.164 | 122 | 419 | 80 | 49 | 48 | 148 |
| Non-treated compound | 59 | 1.163 | 112 | 446 | 63 | 46 | 47 | 188 |

Observations

A comparison of the Mooney viscosity results supports the observations made from the mixing process with only a moderate increase of viscosity from the use of de-vulcanised rubber when compared to the non-treated rubber dust, suggesting an increased level of plastic phase material caused by the de-vulcanising process. The resulting lower mixing temperature minimized the reduction in scorch time and T90, thereby maintaining an acceptable processing safety.

The results obtained from physical testing indicate the presence of chemical bonding between the continuous phase of the new compound and the de-vulcanised rubber dust, with significant improvements to tensile strength, modulus at 300% extension, tear strength and abrasion resistance when compared to the results obtained from the compound containing the non-treated rubber dust. The improved chemical bonding seen with de-vulcanised rubber dust indicates that the de-vulcanising process has increased the number of active sites within the rubber for chemical cross-links to form bonds to the new rubber matrix.

The relatively inert nature of conventional non-treated rubber dust limits its use in new rubber compounds to that of a diluent filler for non-demanding applications. Its poor incorporation due to difficult wetting in new rubber compounds and its inability to chemically bond during the curing process result in difficult processing and poor physical properties. The high volume loss observed on abrasion is a result of the non-bonded rubber dust particles being more easily 'torn' from the new rubber matrix by an abrasive surface. A further indication of the non-treated rubber dust's inability to chemically bond to the new rubber matrix during vulcanisation is the reduction in tensile strength and modulus at 300% extension.

By comparison, the abrasion result, tensile strength and modulus at 300% extension obtained from the test pieces incorporating de-vulcanised rubber dust were both within specification and very close to the result obtained from the standard commercial compound, clearly indicating the presence of chemical bonds.

REFERENCES

1. Tobolsky, A. V. Polymer Science and Materials; Wiley-Interscience: New York, 1960 (hereby incorporated by reference to the extent permitted by national law)
2. M. Kojima, M. Tosaka, E. Funami, K. Nitta, M. Ohshima, S. Kohjiya, Phase Behaviour of Crosslinked Polyisoprene Rubber and Supercritical Carbon Dioxide (hereby incorporated by reference to the extent permitted by national law).
3. V. M. Deeb, M. W. Rouse, U.S. Pat. No. 6,680,110, Particle Size Reduction Using Supercritical Materials (hereby incorporated by reference to the extent permitted by national law).

The invention claimed is:

1. A method for breaking chemical cross links in vulcanised rubber materials to create de-vulcanised rubber, the method comprising:

treating a vulcanised rubber material with a supercritical fluid maintained at supercritical pressure and temperature to cause swelling of the said vulcanized rubber material, and subsequently rapidly reducing the supercritical fluid pressure to a controlled pressure level to cause vaporization of said supercritical fluid, thereby rapidly expanding the vulcanised rubber material beyond the restraining capability of the chemical cross links, but within the extendable limits of the long chained molecular backbone of the rubber, thereby causing preferential breakage of the chemical cross links while maintaining the integrity and molecular weight of the rubber molecules, wherein the rapid reduction of the supercritical pressure takes place over a timescale of greater than 0.5 seconds and less than 60 seconds, and wherein the rate and extent of the rapid reduction of the supercritical fluid pressure are controlled to obtain breaking of sulphur-containing linkages in the vulcanized rubber material without explosive decompression thereof.

2. A method according to claim 1, further comprising adding an additive before allowing said vulcanised rubber to swell, wherein said additive is a de-vulcanising agent.

3. A method according to claim 1, wherein the vulcanised rubber is swollen on the outer surface but un-swollen in the inner core.

4. A method according to claim 1, wherein the pressure reduction in rapid reduction of supercritical fluid pressure is in the range from 2-300 bar.

* * * * *